United States Patent Office 2,875,173
Patented Feb. 24, 1959

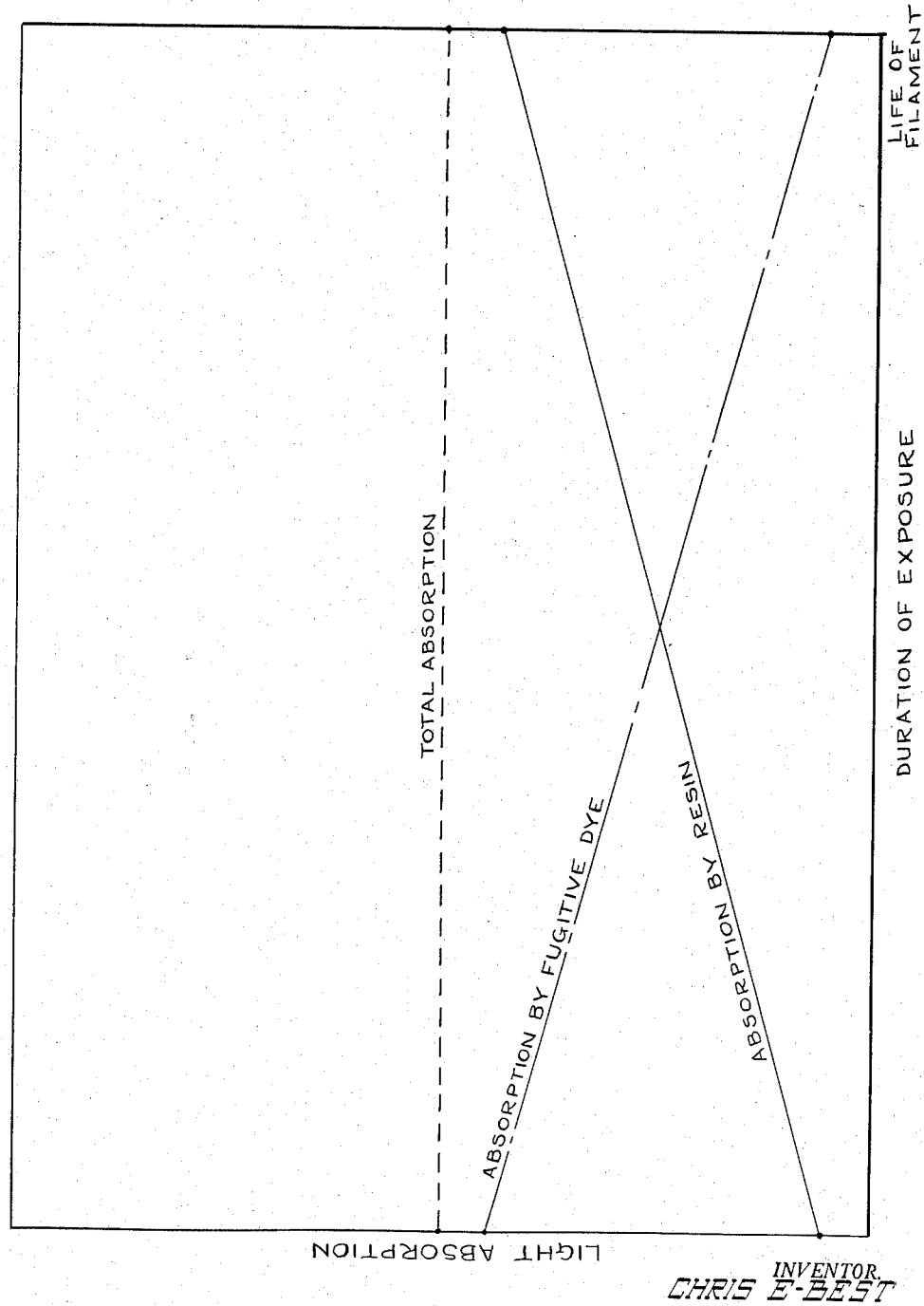

2,875,173

CONSTANT COLOR COMPOSITION COMPRISING VINYLIDENE CHLORIDE-VINYL CHLORIDE COPOLYMER AND CURCUMIN

Chris E. Best, Franklin Township, Summit County, Ohio, assignor to The Firestone Tire & Rubber Company, Akron, Ohio, a corporation of Ohio Application August 30, 1954, Serial No. 453,057

1 Claim. (Cl. 260—41)

This invention relates to the coloring of vinylidene chloride resins with a light-fugitive yellow coloring material which fades as the resin yellows on aging, thereby obtaining a resin composition of relatively constant color.

Actinic light rays cause the discoloration of vinyl resins on aging. Many light stabilizers have been found which inhibit or retard this discoloration, but no stabilizer has been found which prevents the ultimate development of a yellow color in the resin when subjected to actinic light rays.

According to this invention the resin is artificially colored by adding to it a yellow dyestuff which colors the resin approximately the same color as is formed in it by actinic light rays. The added color is one which is decomposed and fades when subjected to actinic light. By incorporating this yellow dyestuff in the resin before it ages, a product is obtained which is more uniform in color throughout its subsequent life because the actinic light rays of the sunlight or other light which cause this color to fade, simultaneously cause the resin to yellow. The dyestuff is added in an amount which gives approximately the same depth of color as is developed in the resin on prolonged aging. As the added color fades, the color produced on aging deepens. The one complements the other, at least in a general sense. Thus throughout the life of the resin the color remains fairly constant.

The yellowing of such resin on aging has been particularly objectionable in colored resin products. Ordinarily, colored products are obtained by pigmenting the resin. As the resin yellows on aging, the color of the pigmented resin changes. For instance, if the resin is initially colored blue, it will change to green on aging. This change is reduced or substantially eliminated by incorporating a fugitive yellow dyestuff in the resin, as herein disclosed. The yellow produced on aging gradually replaces the yellow which is added initially and fades during the aging. Thus the color of the resin in a new product is substantially the same color, as the color of the aged resin in which the added dyestuff has faded.

The invention relates more particularly to the coloring of a resin containing about 85 parts of vinylidene chloride to about 15 parts of vinyl chloride. More generally, the resin, which is crystalline, may be vinylidene chloride polymer or any copolymer of vinylidene chloride and up to 20 percent of one or more ethylenically unsaturated monomers which are copolymerizable therewith. Suitable comonomers include, for example, vinyl chloride, vinyl fluoride, vinyl acetate, styrene, acrylic and methacrylic esters such as methyl methacrylate, ethyl methacrylate and the like, acrylonitrile, vinyl-type ethers and ketones such as methylvinyl ether, methylvinyl ketone and related compounds such as methylisopropenyl ketone and the like. For a more complete list of compounds known to copolymerize with vinylidene chloride to produce resins see Krczil, "Kurzes Handbuch der polymerizationstechnik," vol. II, "Mehrstoffpolymerization," Edwards Bros., Inc., page 739, the items indented under "Vinylidene chlorid."

Numerous dyestuffs can be employed. The preferred dyestuffs fade out completely. The rate at which the different dyes fade varies, and the one selected will depend upon whether or not a light stabilizer is added to the resin. The different light stabilizers are not equally effective, so the stabilizer used, and the amount of it, should also be considered in determining which dyestuff to employ.

A dyestuff which has proved particularly satisfactory with an efficient light stabilizer is curcumin (turmeric extract). Using a very small fraction of one part by weight per 100 parts of the resin proved quite satisfactory. Thus a resin composition was prepared from copolymer made from 85 parts (by weight) vinylidene chloride and 15 parts vinyl chloride as follows:

| | Parts by weight |
|---|---|
| Copolymer | 100 |
| Di-n-propyl tetrachlorophthalate | 4.5 |
| Glycidyl phenylether | 2 |
| 4-t-butyl phenyl salicylate | 2 |
| Curcumin | 0.01 |

These ingredients were blended by suitable means, and the blend was molded into plaques at 180° C. A second such blend was melt-extruded and oriented to yield a filament having a diameter of .008 inch. When subjected to natural aging and also when subjected to accelerated aging under a sunlamp, the color of the plaques and filament remained substantially unchanged from the time they were made until after the dyestuff had faded out and the light stabilizer had lost its effect.

Glycidyl phenylether was used in the foregoing formula as a heat stabilizer. No heat stabilizer need be employed.

The light stabilizers most commonly employed are salicylates, as for example, 4-t-butyl phenyl salicylate (of the foregoing formula), phenyl salicylate, 4-octyl phenyl salicylate, 2-methyl phenyl salicylate, 4-chloro phenyl salicylate, 3-methyl phenyl salicylate, 4-t-amyl phenyl salicylate, 4-nonyl phenyl salicylate, 2-octyl-4-methyl salicylate, 2-isopropyl salicylate, nonyl salicylate, ethylhexyl salicylate, n-butyl salicylate, etc. Other light stabilizers that may be used include the hydroxybenzophenones such as 2,2'-dihydroxybenzophenone, 2-hydroxy-5-chlorobenzophenone, etc.

It is not necessary to employ a light stabilizer. If the light stabilizer is omitted the resin discolors more rapidly than if one is employed, and a dyestuff more fugitive than curcumin is used. Conversely, with very effective light stabilizers dyestuffs more light stable than curcumin would be selected. The ultimate color of the resin is the same, whether a light stabilizer is used or not, so the resin is originally colored the same depth of yellow.

The drawing illustrates the effect of the fugitive dye on a filament or other vinylidene resin product. The life of the filament is plotted along the abscissa. Most of the light absorbed by freshly dyed resin is due to the fugitive dye, as illustrated. As the dye fades, the light absorbed by it decreases. Concurrently the amount of light absorbed due to the discoloration of the resin increases. In practice, most dyes fade most rapidly at the start, and the absorption of light therefore decreases somewhat less rapidly as the resin ages. The drawing represents an ideal condition which is only approached in practice.

Other dyestuffs than curcumin which can be used include Yellow GGA, Yellow BN, Du Pont Azo Yellow, Stilbene Yellow G, etc.

The dyestuff must be compatible with the resin. It must be stable in the resin at the temperature of extrusion or any other fabrication operation employed. Furthermore, it should not contribute to the instability of the resin at any such elevated temperature. Subject only to these limitations, any yellow dyestuff of proper shade which fades in light at a suitable rate may be employed in practice of this invention.

The invention is defined in the claim which follow.

What I claim is:

A composition comprising a copolymer of 85 parts by weight of vinylidene chloride and 15 parts by weight of vinyl chloride, which composition contains 0.01 percent of curcumin, 2 percent of glycidyl phenylether and 2 percent of 4-t-butyl phenyl salicylate, said percentages being based on the weight of the copolymer.

References Cited in the file of this patent

UNITED STATES PATENTS

| | | |
|---|---|---|
| 2,346,766 | Land | Apr. 18, 1944 |
| 2,548,376 | Jones et al. | Apr. 10, 1951 |
| 2,719,090 | Beachley | Sept. 27, 1955 |

OTHER REFERENCES

Modern Plastics, December 1949, page 156.